(12) United States Patent
Goytemirov

(10) Patent No.: US 12,415,483 B2
(45) Date of Patent: Sep. 16, 2025

(54) BRAKE DEVICE FOR SLOWING VEHICLE MOVEMENT

(71) Applicant: Ramzan Goytemirov, Tbilisi (GE)

(72) Inventor: Ramzan Goytemirov, Tbilisi (GE)

(*) Notice: Subject to any disclaimer, the term of this patent is extended or adjusted under 35 U.S.C. 154(b) by 386 days.

(21) Appl. No.: 18/044,307

(22) PCT Filed: Mar. 23, 2021

(86) PCT No.: PCT/GE2021/000002
§ 371 (c)(1),
(2) Date: Mar. 7, 2023

(87) PCT Pub. No.: WO2022/049404
PCT Pub. Date: Mar. 10, 2022

(65) Prior Publication Data
US 2023/0311822 A1    Oct. 5, 2023

(30) Foreign Application Priority Data

Sep. 7, 2020  (GE) .................. 202015436

(51) Int. Cl.
*B60T 1/06* (2006.01)
*F16D 49/00* (2006.01)
*F16D 65/02* (2006.01)
*F16D 65/12* (2006.01)

(52) U.S. Cl.
CPC .............. *B60T 1/067* (2013.01); *F16D 49/00* (2013.01); *F16D 65/028* (2013.01); *F16D 65/127* (2013.01)

(58) Field of Classification Search
CPC . B60T 1/067; B60T 1/06; F16D 49/00; F16D 65/028; F16D 65/127
See application file for complete search history.

(56) References Cited

U.S. PATENT DOCUMENTS

| | | |
|---|---|---|
| 5,669,468 A | 9/1997 | Densow |
| 2011/0019953 A1 | 1/2011 | Nuissl et al. |
| 2012/0020602 A1 | 1/2012 | Nuissl et al. |

FOREIGN PATENT DOCUMENTS

| | | |
|---|---|---|
| CN | 102039880 A | 5/2011 |
| CN | 105965388 A | 9/2016 |
| CN | 208855608 U | 5/2019 |
| CN | 210191015 U | 3/2020 |
| KR | 20100055060 A | 5/2010 |

(Continued)

OTHER PUBLICATIONS

Wikipedia contributors, "Mechanical brake" (Russian-language Wikipedia article), Wikipedia, retrieved Jul. 8, 2025, approx. 2 pages.

(Continued)

*Primary Examiner* — Timothy Hannon
(74) *Attorney, Agent, or Firm* — Brett A. Schenck

(57) ABSTRACT

A brake device for vehicles. The brake device includes a brake disc affixed to a wheel axle and a housing with guides affixed to a support hub. At least one guided carriage and a braking element are mounted on the guides to engage the brake disc. The braking element is formed as a roller bearing enclosing the brake disc, with radially oriented elastic elements fixed to the brake disc, and distal ends are flush or free of play with the inner surface of the inner ring (6) of the roller bearing. The carriage is displaceably mounted relative to the brake disc to enable braking without sliding friction.

1 Claim, 2 Drawing Sheets

(56) References Cited

FOREIGN PATENT DOCUMENTS

| | | |
|---|---|---|
| RU | 2258162 C2 | 8/2005 |
| SU | 417652 A1 | 2/1974 |
| SU | 1737178 A1 | 5/1992 |

OTHER PUBLICATIONS

"The International Search Report (with English translation) of the International Searching Authority, or the Declaration for International Application No. PCT/GE2021/000002", mailed Jul. 15, 2021, 2 pages.
"The Written Opinion (with English translation) of the International Searching Authority, or the Declaration for International Application No. PCT/GE2021/000002", mailed Jul. 15, 2021, 7 pages.
Georgian Patent Office (translated), "Preliminary Search Report for Application No. GEAP202015436," English translation, dated Sep. 7, 2020, 1 page.
Chinese Patent Office (translated), "Search Report for Application No. 2021800747963," dated Jun. 23, 2025, English translation, approximately 1 page.
Chinese Patent Office (translated), "First Notice of Examination Opinion for Application No. 2021800747963," dated Jun. 23, 2025, English translation, approximately 8 pages.
European Patent Office, "Supplementary European Search Report for Application No. EP21863772A," dated Mar. 1, 2024, 2 pages.

BRAKE DEVICE FOR SLOWING VEHICLE MOVEMENT

The present invention relates to braking devices for vehicles. It can be used in a mechanical braking system.

Braking systems were first used in horse-drawn vehicles. The wheel is braked by a pivoting system. A block of wood presses against the wheel and brakes it (see, for example, an article on the Russian-language Wikipedia describing mechanical brakes).

The braking mechanism has not changed significantly over the course of five thousand years. Therefore, it has retained the disadvantageous sliding friction. The brake housing of the Ausco multi-disc brake consists of two parts. There are 12 brake discs in the inner cavity. The brake has a manual stroke control of the brake discs (Brake Systems of Motor Vehicles. L V Mashchenko, V G Rozanov. M. Transport, 1972, pp. 132-133).

The "brake device for mechanical vehicles"—patent RU 2258162—this is the closest prior art of this brake. The disadvantage of the device is the complexity of the design: a large number of small parts and low reliability. And also the susceptibility to maintenance—if there are cracks on the friction materials, you have to change the disc. Also, due to wear, a large amount of product remains stuck between the discs. This can lead to a loss of braking effect. The abrasion products of the brake pad pollute the environment.

The technical result of the proposed invention is the improvement of the reliability and durability of the brake and the simplification of the construction. An advantage of the invention lies in the avoidance of the emission of pollutants into the environment due to sliding friction. The device is designed to be used most effectively for decelerating/stopping movement rather than for momentary/sharp braking.

The braking device according to the invention for braking the vehicle includes a brake disc fixed to the wheel axle. For example, there is a displaceable body on the support hub, which can be mounted in guides, for example. At least one carriage and one braking element can be mounted there, which are provided and to interact with the brake disk. A technical result is thus achieved.

There are the following special features:

The braking element is preferably designed as a roller bearing. It encloses the brake disc. Radially aligned elastic elements are attached to the brake disc. The distal ends of these members preferably have running clearance or clearance-free contact with the inner surface of the inner ring of the rolling bearing.

The illustrations show a braking device used to stop the vehicle. They show:

Figure 1:
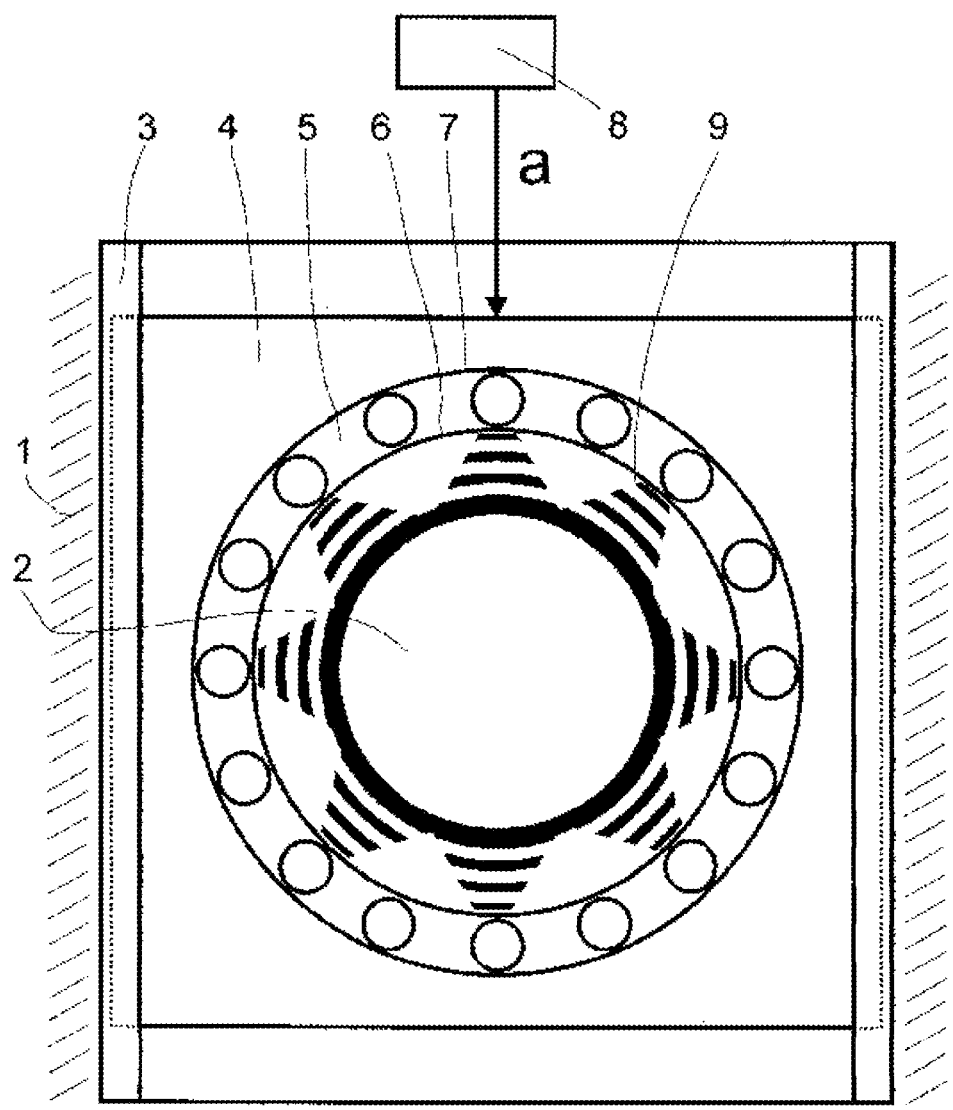
FIG. 1 shows a schematic overall view of the device in the operating state.
Figure 2:
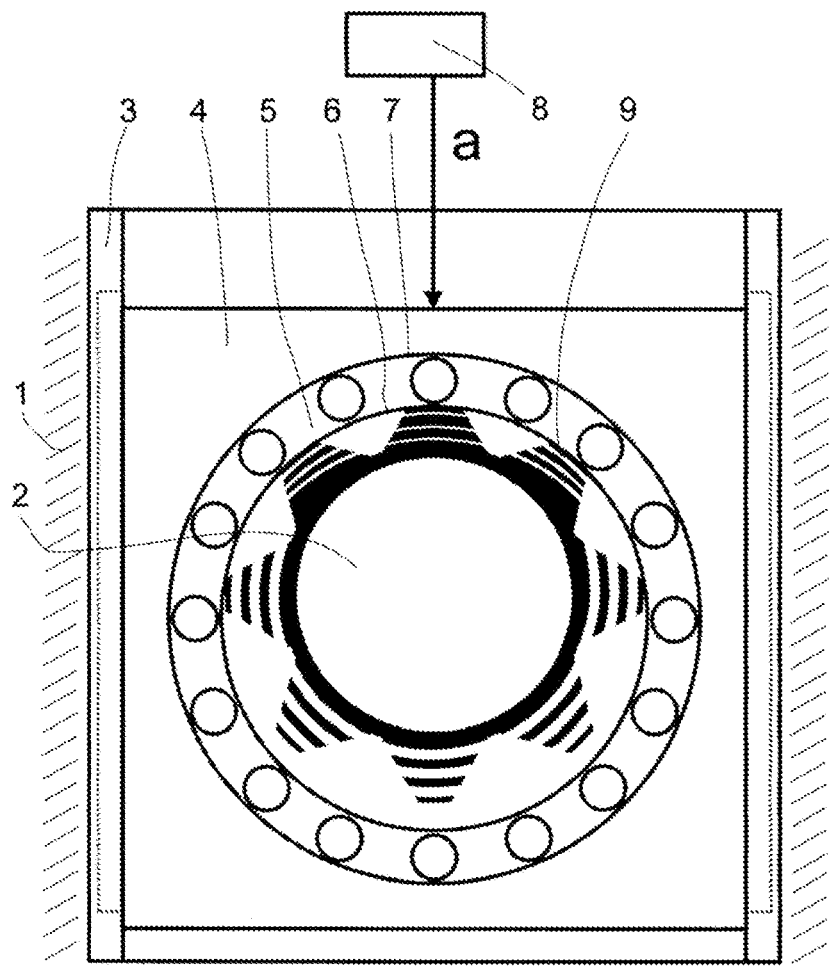
FIG. 2 shows a schematic overall view of the device in the decelerated/braked condition.

A braking device for braking a vehicle comprises: preferably a housing 1 which may be fixed to the wheel hub. The brake disc 2 interacts with the braking device. The housing 1 is equipped with radially moveable guide rails. These can be provided as a run for the carriages. The slide is movably mounted and can be controlled via a brake control unit. A radial roller bearing 5, with rings 6 and 7, is provided on the carriage as part of the braking device. These serve as a mount for the roller bearings.

Between the inner ring 6 of the bearing 5 and the disc 2 are radially aligned from the disc 2 elastic elements 9, z. B. springs arranged. In this case, one end of the elastic elements 9 is rigidly connected to the pane 2. The other ends are either in light contact with the inner surface of the inner ring 6 of the bearing 5 or slightly spaced therefrom. Both prevent undesirable friction of the braking device while driving.

The braking device works as follows:

The disc 2 rotates in conjunction with the rotation of the wheel during running of the vehicle. When driving, the disc 2 and the bearing 5 are concentric. The rotating process of the disc 2 takes place without this causing a deceleration or braking of the vehicle. During this time, the inner ring 6 of the bearing 5 may be pinched by contact with the springs 9. This allows the inner ring to rotate together with the disk 2 in unison. If the springs 9 have radial play, the inner ring 6 stops. In both cases the springs or the inner ring 6 will not cause any resistance to rotation.

For slowing down or braking, the carriage 4 is actuated, for example, by means of the brake control device 8. This is shifted in relation to disc 2. The carriage 4 or the bearing 5 can be moved in the guides 3 in direction "a". The movement leads to a parallel displacement between the axes of rotation of the disk 2 and the inner ring 6. The distance between the disk 2 and the inner ring 6 is thus smaller in one section and larger in an opposite area of the disk.

The inner ring 6 of the bearing pushes and compresses the elastic elements in the area of reduced distance between disc 2 and inner ring 6. In the opposite area on the other side of the disc 2, the elastic elements 9 are free from interactions with the inner ring 6. During braking the rotation of the disc 2 and the rotation of the inner ring 6 of the bearing 5 continues. As a result, the inner ring 6 of the bearing 5 successively compresses the elastic elements 9. This happens sequentially in the direction of rotation of the disc. The disk 2 is forced during its rotation to overcome the forces of compression of the elastic elements 9 that are now acting. The more the bearing 5 moves in the radial direction, the more the elastic elements 9 are pushed together. The greater the resistance force acting on the rotating disk 2. And the vehicle wheel decelerates/stops.

As can be seen from the operation of the device, when decelerating and braking, pads sliding on the discs are not used. The proposed device works without harmful sliding friction. This distinguishes them from all previous braking devices. It is replaced by rolling friction and compression of the elastic components. This results in a causal relationship between the distinguishing features and the result achieved.

The invention claimed is:

1. A braking device for slowing a vehicle with a brake disc (2) which is arranged on the wheel axle wherein at least one guided carriage (4) and a brake element (5) attached thereto, which are designed to interact with the brake disc (2), are located on a support hub of the vehicle, characterized in that the braking element (5) is designed as a roller bearing with an inner ring (6) which encloses the brake disc (2) and is aligned coaxially with the brake disc in the operational, non-braking state and that radially arranged elastic elements (9) are fixed to the brake disc wherein the distal ends are flush or free of play with the inner surface of the inner ring (6) of the roller bearing and that the carriage (4) is displaceably mounted relative to the brake disc (2).

* * * * *